May 20, 1930.  W. VAN RIJSWIJK  1,759,074
LIQUID SEALED GLAND FOR MACHINE SHAFTS
Filed June 3, 1927
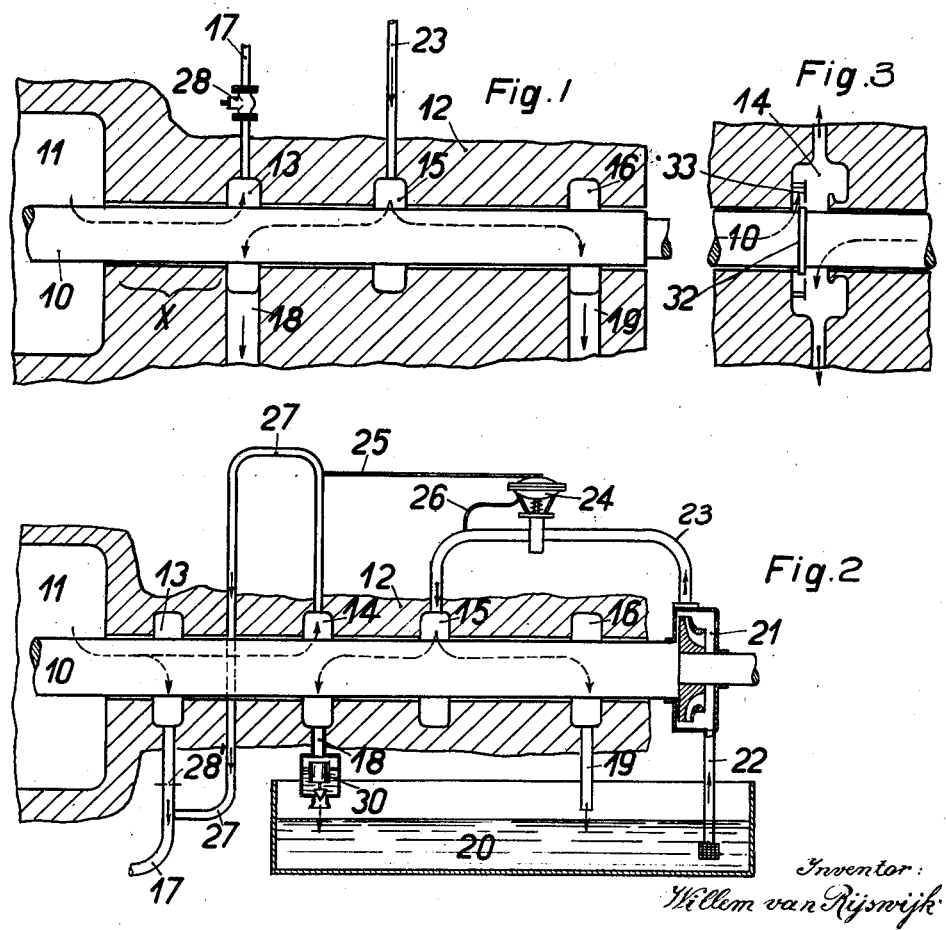

Patented May 20, 1930

1,759,074

UNITED STATES PATENT OFFICE

WILLEM van RIJSWIJK, OF BADEN, SWITZERLAND, ASSIGNOR TO AKTIENGESELL-SCHAFT BROWN BOVERI & CIE., OF BADEN, SWITZERLAND, A JOINT-STOCK COMPANY OF SWITZERLAND

LIQUID-SEALED GLAND FOR MACHINE SHAFTS

Application filed June 3, 1927, Serial No. 196,180, and in Germany April 12, 1926.

This invention relates to liquid sealed glands for leading out operating shafts from machines handling gases at a superatmospheric pressure, such as steam turbines or centrifugal compressors.

The general object is the provision of a gland construction employing a liquid sealing medium which will be effective to prevent loss of gases from the machine about the shaft, at the same time avoiding all possibility of the sealing liquid finding its way into the machine.

Another object is the provision of an arrangement whereby the flow of sealing liquid is regulated automatically in accordance with the pressure of the working fluid in the machine.

Other and further objects will be pointed out or indicated hereinafter or will be obvious to one skilled in the art upon an understanding of the invention or its employment in practice.

In the drawing forming a part of this specification I illustrate two arrangements of structure embodying the invention, these being shown in diagrammatic fashion. It must be understood, however, that these are presented for illustrative purposes only and are not to be construed in any fashion as having the effect of limiting the claims short of the true and most comprehensive scope of the invention in the art.

In the drawing,

Fig. 1 is a longitudinal sectional view through a gland construction embodying the invention, showing in diagrammatic fashion a part of the shaft with which it cooperates and a portion of the machine casing served by the gland and shaft, Fig. 2 is a similar section, diagrammatic in form, of a modified gland arrangement, and Fig. 3 shows a detail of one of the gland chambers.

Packing or sealing glands in which a liquid is employed as the sealing medium are largely used for the shafts of steam turbines and centrifugal compressors, and find particular application to blowers or compressors which deal with gases of a poisonous or offensive character.

It is well recognized that the use of a liquid sealing medium for shaft glands is attended by certain disadvantages, one of the chief of which is the tendency of the sealing liquid to creep along the shaft and enter the machine casing where its presence may be productive of harmful results. With gas boosters dealing with illuminating gas for instance, which are often fitted with water-sealed glands, it is highly important that no water should be allowed to obtain ingress to the booster.

The present invention provides a certain and sure method of preventing the sealing liquid in shaft glands of the liquid sealed type from entering the machine casing with possibly harmful effect. This is accomplished by providing for continuous flow from the machine casing of some of the working substance therein toward and through the adjacent portion or section of the gland. Means are provided for regulating this flow of working substance at will, so that only sufficient is used to counteract the creeping tendency of the sealing liquid. In cases where even a small loss of working substance from the machine cannot be permitted, or when the discharge of such substance to the atmosphere would occasion inconvenience, a modified arrangement is adopted whereby the whole of the working substance passing into the gland is recovered and returned to the machine.

A more detailed understanding of the invention may be obtained by consideration of the illustrative arrangements shown in the drawing. There are three chambers or annular spaces in the gland, and the sealing liquid is supplied to the central chamber 15 by the pipe 23. To maintain a flow of working substance from the interior of the machine through the section of gland marked X in the drawing, the innermost chamber 13 is placed in communication with some form of device for producing a low pressure, such as an ejector apparatus or a chimney stack, by means of the pipe 17. A valve 28 placed in this pipe permits the flow through the section of gland X to be adjusted so that the desired result is obtained with the minimum loss of working substance.

If it is imperative that the whole of the working substance should be recovered, or its discharge into the atmosphere prevented, the arrangement illustrated in Fig. 2 of the drawing may be adopted. As in Fig. 1, the shaft 10 is surrounded by a suitable gland 12 continuous with the machine casing. The liquid seal is provided by three chambers 14, 15 and 16, the centre one of which receives a supply of liquid for sealing purposes from the pump 21 via pipe 23. This pump draws its supply from a reservoir 20 to which it again returns from the chambers 14 and 16 by pipes 18 and 19 respectively. A float valve arrangement 30 is fitted to the discharge end of the pipe 18 so that no gas can leak out of the gland by this path. In the gland portion lying between the machine casing and the chamber 14 is placed an intermediate auxiliary or tapping chamber 13 communicating by way of the pipe 17 with a part of the machine casing which carries a lower internal pressure. The flow of working substance thus occasioned is throttled by a suitable diaphragm 28' inserted in the pipe line 17. The inner tapping chamber 14 for the sealing liquid is connected by a pipe 27 direct to the lower pressure, i. e., to the pipe 17 at a point on the low-pressure side of the throttling diaphragm 28. In this way a flow of working substance is maintained along the shaft from 13 to 14, and leakage of liquid into the machine is effectively prevented. No loss of working substance is occasioned by the use of this arrangement, since it is all returned to the machine. The chamber 14 forms a meeting place for the working substance from the machine and the sealing liquid from the gland and if these are allowed to mix freely there is a danger of some of the liquid being entrained and carried over into the machine. To prevent such a possibility it is desirable to provide means for separating the two substances as far as possible and an example of such means is illustrated diagrammatically in Fig. 3 of the drawing. The shaft 10 is provided with a collar 32 where it enters the gland chamber 14 and a baffle plate 33 with a very small clearance from the collar directs the stream of gas in a manner tending to prevent it from mixing with the liquid coming from the gland. The directions of flow are indicated by the dotted lines and arrows.

The extent to which leakage of sealing liquid into the machine casing tends to take place is dependent on the volume of flow of the said sealing liquid, which is proportional to the difference between the pressure of the sealing liquid and the pressure prevailing in the inner chamber 14. When the pressure within the machine is liable to variations over wide limits it becomes necessary to vary the pressure of the sealing liquid accordingly if the leakage tendency is to be maintained at a minimum. This result may be obtained in a very simple manner by inserting a pressure regulator in the pipe 23 as shown at 24 in Fig. 2. The regulator consists of a valve actuated by a spring-loaded diaphragm and controlled by the pressures in pipes 23 and 27, which are applied above and below the diaphragm by the pipes 25 and 26 respectively. A change in one of the pressures causes a movement of the diaphragm and a resetting of the valve in pipe 23 so as to restore the pressure difference to its former value. Thus, however the pressure conditions may vary within the machine, the proper action of the seal will be maintained and leakage, either of gas outwards or liquid inwards, will be reduced to the absolute minimum.

What I claim is:

1. In a fluid sealed packing gland for a machine casing having a rotating member extending therefrom, a gland structure associated with said casing and surrounding said member, said gland structure having an inlet chamber and outlet chambers, a reservoir arranged adjacent said gland structure, conduits connecting said outlet chambers with said reservoir, a conduit connecting one of said outlet chambers to a low pressure space, and means for controlling the supply of sealing fluid to said inlet chamber in accordance with pressure variations in the outlet chamber connected with the low pressure space.

2. In a fluid sealed packing gland for a machine casing containing an operating medium and having a rotating member extending therefrom, a gland structure associated with said casing and surrounding said member, said gland structure having an inlet chamber and outlet chambers and an auxiliary outlet chamber formed therein, a reservoir arranged adjacent said gland structure, conduits connecting the outlet chambers and said reservoir, a conduit connecting one of the outlet chambers and the auxiliary chamber to a low pressure space, means for regulating the flow of operating medium to the low pressure space from the auxiliary chamber, and means for varying the flow of sealing fluid from the discharge chamber connected with the low pressure space.

In testimony whereof I have hereunto subscribed my name this 26 day of April A. D. 1927, at Zurich, Switzerland.

WILLEM van RIJSWIJK.